(12) United States Patent
Goban et al.

(10) Patent No.: US 12,470,305 B2
(45) Date of Patent: Nov. 11, 2025

(54) QUANTUM REPEATER FOR OPTICAL NETWORK AND METHOD

(71) Applicant: Nanofiber Quantum Technologies, Inc., Tokyo (JP)

(72) Inventors: Akihisa Goban, Tokyo (JP); Shinya Kato, Tokyo (JP); Ryotaro Inoue, Tokyo (JP); Takao Aoki, Tokyo (JP)

(73) Assignee: Nanofiber Quantum Technologies, Inc., Tokyo (JP)

(*) Notice: Subject to any disclaimer, the term of this patent is extended or adjusted under 35 U.S.C. 154(b) by 270 days.

(21) Appl. No.: 18/348,603

(22) Filed: Jul. 7, 2023

(65) Prior Publication Data

US 2025/0015901 A1  Jan. 9, 2025

(51) Int. Cl.
| | |
|---|---|
| H04B 10/70 | (2013.01) |
| G02B 6/02 | (2006.01) |
| H04B 10/079 | (2013.01) |
| H04B 10/291 | (2013.01) |

(52) U.S. Cl.
CPC .......... *H04B 10/70* (2013.01); *G02B 6/0208* (2013.01); *H04B 10/298* (2020.05); *H04B 10/0795* (2013.01)

(58) Field of Classification Search
None
See application file for complete search history.

(56) References Cited

U.S. PATENT DOCUMENTS

| | | | |
|---|---|---|---|
| 2021/0105135 A1* | 4/2021 | Figueroa | H04B 10/70 |
| 2021/0175976 A1* | 6/2021 | Rahman | H04L 9/0855 |
| 2023/0204863 A1* | 6/2023 | Aoki | G02B 6/2713 |
| | | | 385/30 |

FOREIGN PATENT DOCUMENTS

| | | |
|---|---|---|
| JP | 2016153850 A | 8/2016 |
| JP | 2023055195 | 3/2020 |
| WO | 2022009950 A1 | 1/2022 |

OTHER PUBLICATIONS

EP Search Report from related application No. GB2409632.3 mailed Nov. 25, 2024.
C.-L. Hung et al. "Quantum spin dynamics with pairwise-tunable, long-range interactions", PNAS, 2016, E4946-E4955, 113 (34), www.pnas.org/cgi/doi/10.1073/pnas.1603777113.
L.-M. Duan et al. "Robust quantum gates on neutral atoms with cavity-assisted photon scattering", The American Physical Society, 2005, 032333-1-032333-4, 72, DOI: 10.1103/PhysRevA.72.032333.
L.-M. Duan et al. "Scalable Photonic Quantum Computation through Cavity-Assisted Interactions", The American Physical Society, 2004, 127902-1-127902-4, DOI: 10.1103/PhysRevLett.92.127902.
H. J. Briegel et al. "Quantum Repeaters: The Role of Imperfect Local Operations in Quantum Communication", The American Physical Society, Dec. 28, 1998, vol. 81, No. 26, p. 5932-5935.

* cited by examiner

*Primary Examiner* — Darren E Wolf
(74) *Attorney, Agent, or Firm* — Richard T. Ogawa; Ogawa P.C.

(57) ABSTRACT

In an example, the present invention provides a quantum repeater system and its application to quantum network. The quantum repeater system includes a nano-fiber based quantum computer device.

26 Claims, 4 Drawing Sheets

1. Select target atom in each repeater

2. Atom-photon entanglement

3. Remote atom-atom entanglement

QUANTUM REPEATER FOR OPTICAL NETWORK AND METHOD

BACKGROUND OF INVENTION

The present invention relates generally to quantum repeater techniques. In particular, the present invention provides a system and method including a nanofiber region configured using an optical cable and a pair of reflectors to enable a cavity for a quantum information processing device and connecting remote quantum information processing devices coherently. Merely by way of example, the invention can be applied to a variety of applications such as secure quantum communication, quantum sensing network and distributed quantum computing towards drug discovery, optimization, machine learning and artificial intelligence, finance, weather forecasting, chemical, mechanical, electrical, civil, nuclear fusion and fission, economics, materials, and any other complex human or non-human matters.

Quantum repeater is a type of quantum information processing device that utilizes quantum mechanics to perform certain tasks more efficiently and securely than classical repeater. In classical repeater, bits can exist in one of two states, either 0 or 1 and bits can be amplified if necessary, but in quantum repeater, qubits can exist in a superposition of both 0 and 1 states simultaneously and cannot be copied or amplified owing to the no-cloning theorem. This allows quantum repeaters to perform certain quantum communication robustly and securely without any eavesdropping even in principle. Furthermore, quantum repeater devices facilitate distributed quantum computing that is exponentially faster than classical computing for certain tasks such as factorization of large numbers, optimization problems, and simulations of quantum systems.

However, quantum repeater also has some drawbacks. One major challenge is that qubits are highly susceptible to noise and decoherence, which can cause errors during repeater operation.

In addition, optical fiber cables have a finite loss during the long-distance transmission of photons such that quantum repeaters should be placed before completely losing the quantum information. Therefore, quantum repeater network requires careful error mitigation and/or error correction techniques to maintain the accuracy of quantum state transfer and entanglement generation. Additionally, the physical hardware required for quantum repeater is complex and expensive to build and maintain, which makes quantum repeaters difficult and costly to scale up.

From the above, it is seen that techniques for improving quantum repeater are desired.

SUMMARY OF INVENTION

According to the present invention, techniques generally related to quantum repeater are provided. In particular, the present invention provides a system and method including a nanofiber region configured using an optical cable and a pair of reflectors to enable a cavity for a quantum information processing device. Merely by way of example, the invention can be applied to a variety of applications such as secure quantum communication, quantum sensing network and distributed quantum computing towards drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a quantum repeater system and its application to quantum network. The quantum repeater system includes a nano-fiber based quantum computer device.

In an example, the present invention provides a quantum repeater system and its application to quantum network. In an example, the system has a fiber optical cable having a first end region and a second end region. The first end region has a first end, and the second end region having a second end. In an example, the system has a first fiber Bragg Grating configured on the first end region and a second fiber Bragg Grating configured on the second end region. In an example, system has a nanofiber region configured from a center portion of the fiber optic cable and coupled between the first end region and the second end region. In an example, the system has a first taper region configured from a first portion of the nanofiber region within a vicinity of the first fiber Bragg Grating and a second taper region configured from a second portion of the nanofiber region within a vicinity of the second fiber Bragg Grating. In an example, the system has a cavity formed from the nanofiber region between the first fiber Bragg Grating and the second fiber Bragg Gratings. In an example, the system has a plurality of atoms evanescently coupled at least the nanofiber region between the first fiber Bragg grating and the second fiber Bragg grating. In an example, the imaging system is configured to generate an optical tweezer array and to detect one or more photons from one or the plurality of atoms with a spatial resolution.

Depending upon the example, the present invention can achieve one or more of these benefits and/or advantages. In an example, the present invention provides a quantum repeater device using a nanofiber cavity QED system configured with an optical cable including the nanofiber region and a pair of reflectors, and evanescently coupled atoms to the nanofiber region to form an atom-cavity system for a quantum repeater. In an example, the device uses conventional optical techniques, and is compact and efficiently integrated by using fiber optic devices. In an example, the present invention offers advantages of coherent state transfer between stationary and flying qubits by utilizing atoms and photons that are suitable for long-distance quantum communication and efficient interconnection among distant quantum repeater systems. In a preferred example, the present system allows for control of individual atoms one by one using the present imaging system, which enables entanglement generation and purification. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF FIGURES

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF EXAMPLES

Figure 1:
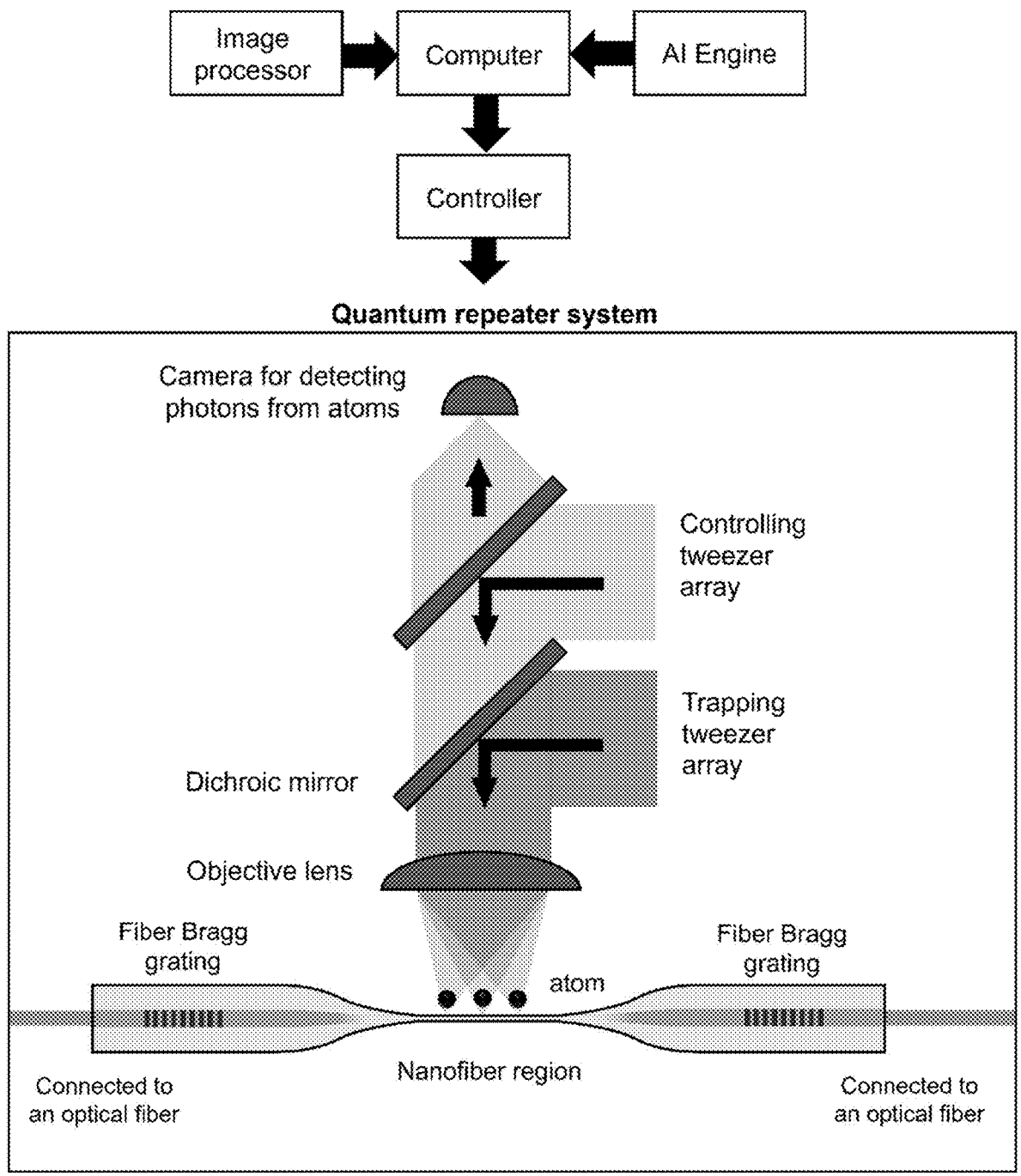
FIG. 1 is a simplified diagram illustrating a quantum repeater system according to an example of the present invention.

FIG. 1 is a simplified diagram illustrating a quantum repeater cell device according to an example of the present invention. In an example, the diagram illustrates a quantum repeater system, which will be described more fully below. As shown, the diagram includes a device and related system. The device includes a nanofiber region, which is thinner in diameter. A plurality of atoms is disposed slightly above the surface of the nanofiber region. In an example, the atoms are localized about 200 to 400 nanometers above the nanofiber surface for a 400 to 1000 nanometer nanofiber diameter, although there can be variations. In an example, each side of the nanofiber region is configured with a taper region that is connected to a fiber Bragg Grating structure. Each end of the fiber Bragg Grating structure is connected to the optical cable that has a photodetector device provided in a photon detection system.

In an example, the system has an imaging system. The imaging system has an image capturing device and a light source. The device also has a variety of optics including an objective lens and a dichroic mirror device configured between the image capturing device and the light source. The image capturing device includes a CMOS or charged coupled device camera including a pixel array.

In an example, the system also has a controller coupled to the imaging system and light source. The controller is also coupled to a computing device, artificial intelligence engine, and image processor. The controller can be any suitable controller device including a plurality of analog-to-digital/digital-to-analog converter devices configured to interface with a computer. As shown, the controller for controlling signals from a quantum computer device is a specialized electronic system designed to interface with the quantum computing system and manipulate the signals sent and received by the device. The controller plays a crucial role in quantum computing, as it is responsible for orchestrating the complex operations required to perform quantum algorithms and measurements.

In an example, the controller typically has several components, including input/output interfaces, digital signal processing circuits, and control logic. The input/output interfaces are used to communicate with the quantum device, receiving signals from the quantum device and sending control signals to the device. These signals are typically in the form of electrical, microwave, or radio frequency signals. The digital signal processing circuits are responsible for processing the signals received from the quantum device, applying corrections for errors and noise, and performing operations such as pulse shaping and timing. This requires specialized algorithms and processing techniques that are optimized for quantum computing applications. The control logic is responsible for coordinating the operations of the controller and the quantum device, determining the appropriate sequence of operations to perform quantum algorithms and measurements. The control logic is typically implemented using a combination of software and hardware, including field-programmable gate arrays (FPGAs) and custom application specific integrated circuits (ASICs).

In a preferred example, the system includes an optical tweezer that is a device that uses a focused laser beam to trap and manipulate microscopic objects, such as atoms and molecules. In an example, a basic principle behind an optical tweezer is that the laser beam exerts a force on the object that is proportional to the gradient of the intensity of the light. In the example of manipulating atoms, an optical tweezer typically involves a laser beam that is tightly focused to a diffraction-limited spot using a high numerical aperture objective lens. The laser beam is usually in the infrared or visible range and can be generated by a solid-state laser or a diode laser or other types of lasers. When the laser beam at an appropriate wavelength is focused on an atom, it creates an attractive force that pulls the atom towards the center of the beam. This is known as optical trapping, or "optical tweezing." The strength of the trapping force depends on the intensity of the laser beam and the polarizability of the atom. By manipulating the position and intensity of the laser beam, we can trap atoms at a fixed distance from the nanofiber surface owing to the interference between incoming tweezer beam and its scattering from the nanofiber.

In an example, the system has a plurality of atoms comprising an alkali metal atom including an alkaline-earth metal and/or an alkaline-earth-like atom and/or other laser coolable atoms including a cesium and/or a rubidium and/or ytterbium and/or a strontium and/or other laser-coolable atoms such that a number of the atoms range from one to 100,000 (and more) and are evanescently coupled to the nanofiber region.

In an example, the system has an imaging system characterized by a numerical aperture of 0.1 and greater, although there can be variations. In an example, the imaging system is configured to generate an optical tweezer array and to detect one or more photons from one or the plurality of atoms with a spatial resolution ranging from 400 nanometer and larger, although variations can exist.

In an example, the system has an artificial intelligence (AI) engine coupled to the computer system. The AI engine includes two main components: a learning process and an inference engine. In an example, the learning process is responsible for training the AI engine and enabling it to acquire knowledge or skills from data. It involves several steps, which are described further below, which can also include variations:

Data Collection: Relevant and representative data is gathered from various sources, such as databases, the internet, or user interactions. The quality and diversity of the data play a crucial role in the effectiveness of the AI engine.

Data Preprocessing: The collected data is cleaned, organized, and transformed into a suitable format for further analysis. This step may involve tasks like removing noise, handling missing values, or standardizing the data.

Feature Extraction: Important features or patterns are extracted from the preprocessed data. This step aims to capture the most relevant information that will aid the AI engine in making accurate predictions or decisions.

Model Selection: An appropriate machine learning or deep learning model is chosen based on the nature of the problem and the available data. This step involves selecting the architecture, algorithm, and parameters that will best suit the learning task.

Model Training: The selected model is trained using the preprocessed data. During training, the model adjusts its internal parameters iteratively to minimize the difference between its predictions and the actual outputs. This process involves optimization algorithms like gradient descent to update the model's parameters.

Evaluation and Validation: The trained model is evaluated using separate validation datasets to assess its performance. Various metrics are used to measure the accuracy, precision, recall, or other relevant measures, depending on the problem domain.

Iterative Improvement: If the model's performance is not satisfactory, the learning process may involve iterating over previous steps to refine the data, adjust the model, or try different algorithms until a satisfactory level of performance is achieved.

In an example, the AI system also includes an inference engine. In an example, the inference engine, also known as the prediction or decision-making component, is responsible for applying the acquired knowledge to make predictions or decisions on new, unseen data. Once the learning process is complete, the trained model is deployed within the inference engine. The inference engine performs the following steps, which are describe more fully below:

Data Preprocessing: Similar to the learning process, incoming data is preprocessed to prepare it for inference. This typically involves cleaning, transforming, and normalizing the data using the same preprocessing steps applied during training.

Feature Extraction: If necessary, relevant features are extracted from the preprocessed data, ensuring consistency with the features used during training.

Model Inference: The preprocessed data is passed through the trained model, which generates predictions or decisions based on the learned patterns and relationships. The model utilizes its internal parameters to make accurate inferences.

Post-processing: The output generated by the model might undergo additional post-processing steps to refine the results or present them in a suitable format for the end-user or downstream applications.

The inference engine can be integrated into various applications, such as processing data derived from the quantum computing system. In an example, many applications can exist.

Further details of the various types of tweezer arrays are described in U.S. patent application Ser. No. 18/347,121, filed on Jul. 5, 2023, commonly assigned, and hereby incorporated by reference herein. Other applications describe various aspects of components are described in U.S. patent application Ser. No. 18/325,901, filed on May 30, 2023, and Ser. No. 18/347,174, filed on Jul. 5, 2023, each of which is commonly assigned, and hereby incorporated by reference herein.

Figure 2:
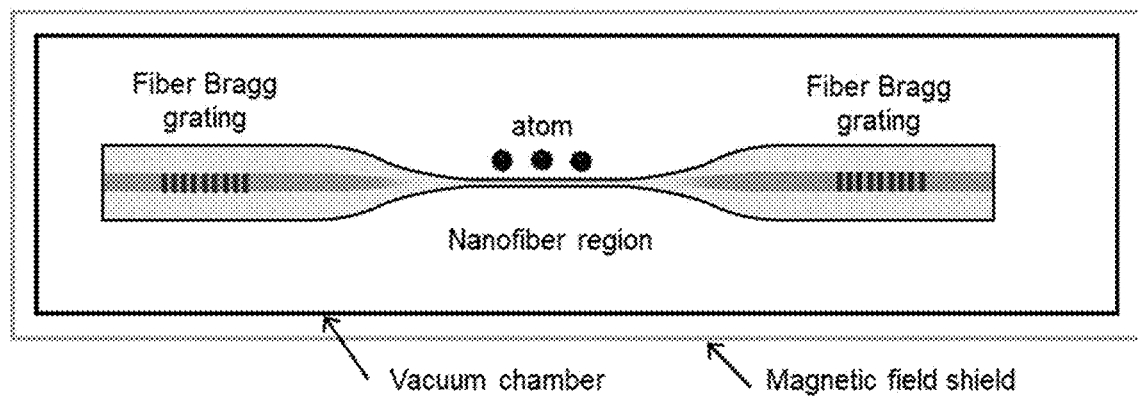
FIG. 2 is a simplified diagram of a vacuum chamber configured with a quantum computing cell device according to an example of the present invention.

FIG. 2 is a simplified diagram of a vacuum chamber configured with a quantum repeater device according to an example of the present invention. As shown a vacuum chamber is configured around a nanofiber cavity device. In an example, the vacuum chamber configured to maintain the nanofiber region in a predetermined vacuum environment, e.g., $10^{-10}$ Torr. In an example, the chamber is maintained at a predetermined temperature environment ranging from room temperature to 4 Kelvin, although there can be others.

In an example, the chamber is substantially free from a magnetic field fluctuation that may interact with one or more of the plurality of atoms. Preferably, the magnetic field fluctuation from the surrounding is blocked from an interior of the vacuum chamber using a magnetic field shield device configured with the vacuum chamber. In an example, the plurality of atoms is cool down to a temperature of below 1 milli-Kelvin to near absolute zero by a magneto-optical trapping generated from a combination of a magnetic field gradient and a laser irradiation from three orthogonal spatial direction, and subsequent laser cooling with atoms trapped in the tweezer array where the motional degree-of-freedom is cool down to the ground state or closer to it.

Figure 3:
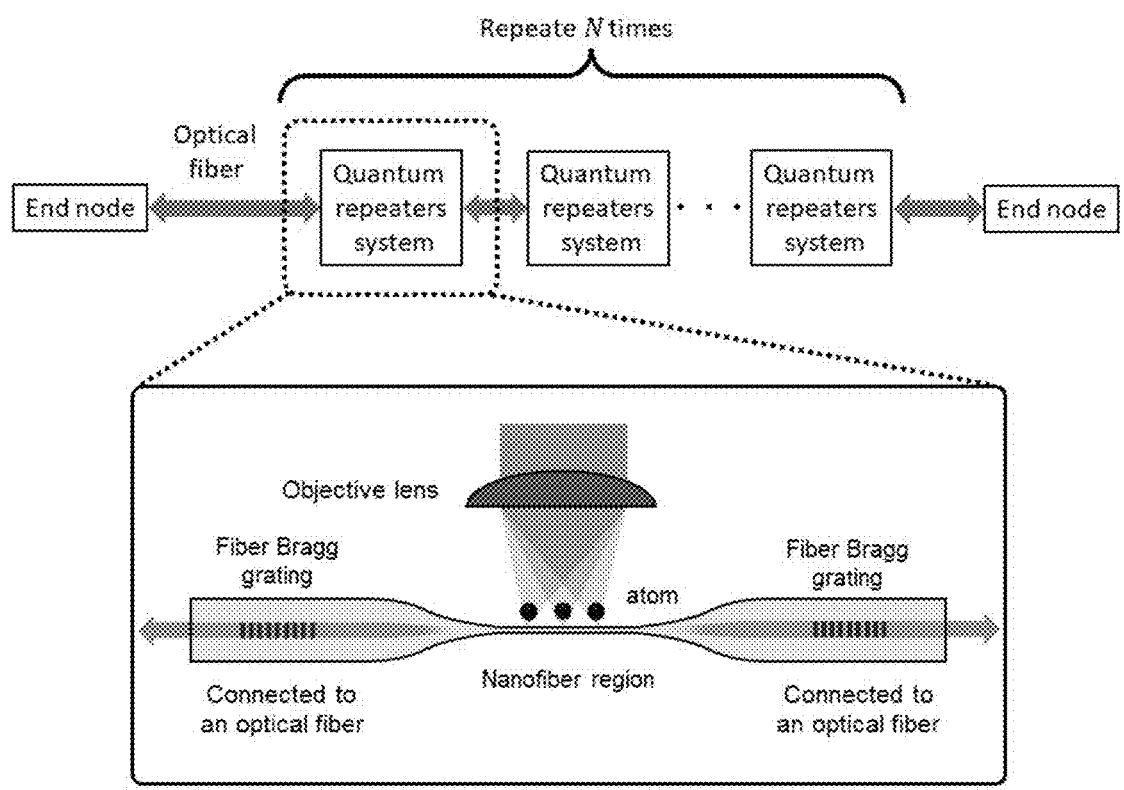
FIG. 3 is a simplified illustration of a method of operating a quantum repeater network according to an example of the present invention.

FIG. 3 is a simplified illustration of a method of operating a quantum repeater network according to an example of the present invention. The quantum repeater network includes a plurality of quantum repeater devices and each end is connected to the end nodes, including a quantum computer device, single-photon or entanglement sources. In an example, the repeater devices in a quantum network are numbered from 1 to N, where N is an integer of 3 or greater, including end nodes, and an intermediary node.

In an example, the quantum repeater system including a plurality of nodes, including an end node consisted of a quantum computer device including single-photon or entanglement sources. In an example, the system has an initial quantum repeater device and a final quantum repeater device, as shown.

In an example, the system has one or more intermediary repeater devices numbered from 1 to N, where N is an integer greater than 1.

Each of the repeater devices has various elements. In an example, the device has a first fiber optical cable having a first end region and a second end region. The first end region has a first end, and the second end region has a second end. In an example, a first fiber Bragg Grating is configured on the first end region and a second fiber Bragg Grating is configured on the second end region.

In an example, a nanofiber region is configured from a center portion of the fiber optic cable and coupled between the first end region and the second end region. A first taper region is configured from a first portion of the nanofiber region within a vicinity of the first fiber Bragg Grating and a second taper region is configured from a second portion of the nanofiber region within a vicinity of the second fiber Bragg Grating.

In an example, a cavity formed from the nanofiber and tapered regions between the first fiber Bragg Grating and the second fiber Bragg Gratings.

In an example, a plurality of atoms comprising at least one or more of an alkali metal atom and/or an alkaline-earth metal or an alkaline-earth-like atom including a cesium and/or a rubidium and/or an ytterbium and/or a strontium and/or other laser coolable atoms are included. A number of the atoms range from one to 100,000 and are evanescently coupled to the nanofiber region between the first fiber Bragg grating and the second fiber Bragg grating. In an example, the atoms can be any laser coolable atoms.

In an example, a laser-coolable atom refers to an atom that can be cooled down to extremely low temperatures using laser cooling techniques. Laser cooling is a method that exploits the interaction between atoms and laser light to reduce the kinetic energy and slow down the motion of atoms.

One commonly used laser cooling technique is called Doppler cooling, which is effective for cooling certain types of atoms. Doppler cooling relies on the principle of the Doppler effect, where the frequency of light changes when the source (atom) and the observer (laser) are in relative motion. By carefully tuning the laser frequency to be slightly below the resonant frequency of the atom, the atom will absorb and re-emit photons, resulting in a net loss of momentum and a decrease in kinetic energy.

Laser cooling requires specific atomic characteristics to be effective. Some of the key properties of a laser-coolable atom should include a closed transition, where the initial and final states of the cooling process involve the same atomic energy level. This ensures that the atom can absorb and re-emit photons multiple times without getting stuck in an excited state or some other intermediate state. In an example, the atom can have a proper energy level structure for laser cooling. The atom should have appropriate energy level spacings that can be manipulated by laser light. Additionally, atoms may include a relatively narrow natural linewidth. In an example, the atom should have a narrow range of possible atomic transitions. This allows for selective absorption and emission of photons, leading to efficient cooling.

Examples of laser-coolable atoms include alkali metals such as rubidium and cesium, as well as alkaline earth metals and alkaline-earth metal like atoms, like strontium and ytterbium. These atoms possess the necessary characteristics mentioned above and have been extensively used in experiments and applications involving laser cooling and trapping.

In an example, the repeater device has an optical system comprising an imaging system. In an example, the optical system comprises an optical tweezer array and optical addressing arrays to trap and manipulate two or more of the plurality of atoms.

An optical cable is coupled between each pair of repeater devices to configure the initial quantum node device including quantum computer device, the intermediary repeater devices, and final quantum node device in a serial connection by transmitting one or more photons from the initial quantum node device to a neighboring intermediary repeater device to then to the neighboring final quantum node device to facilitate to entanglement generation between a pair of adjacent quantum repeaters and initial/end nodes.

In an example, entanglement is a fundamental concept in quantum computing, which describes a unique correlation between two or more quantum systems. In classical computing, bits can only exist in a state of 0 or 1. However, in quantum computing, quantum bits, or qubits, can exist in a superposition of states, representing both 0 and 1 simultaneously.

When qubits become entangled, the states of the qubits become interconnected and dependent on each other. This means that the information about the state of one qubit is directly related to the state of the other qubit, even if they are physically separated by a large distance. This correlation persists even when the qubits are physically separated, leading to the phenomenon of non-locality.

The entanglement of qubits allows for the creation of highly interconnected quantum states that cannot be efficiently represented using classical means. This property forms the basis for many powerful applications of quantum computing, such as quantum teleportation, superdense coding, and quantum error correction.

In an example, entanglement plays a role in quantum algorithms, including Shor's algorithm for factorizing large numbers and Grover's algorithm for searching unsorted databases. It enables exponential speedup and the ability to perform certain computations more efficiently than classical computers. In an example, entanglement allows for the creation of highly interconnected quantum states, enabling powerful computational capabilities not achievable with classical computers.

Figure 4:
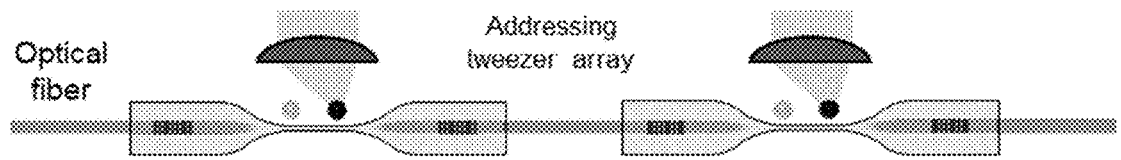
FIG. 4 is a simplified illustration of a method of remote atom-atom entanglement generation between quantum repeater nodes.
Figure 4:
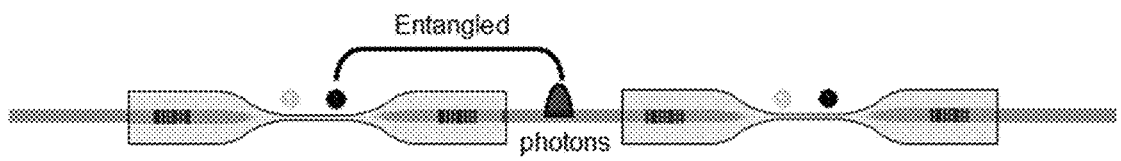
Figure 4:
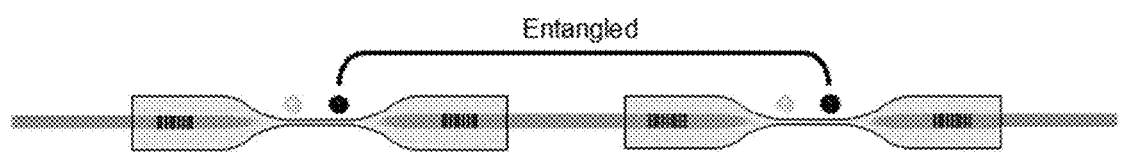

FIG. 4 is a simplified illustration of a method of remote atom-atom entanglement generation. Each one of the atoms in directly adjacent pair of cavities are selected to be resonant to the cavities by frequency shifts induced by the optical addressing tweezer arrays, so called ac Stark shift. Then, the atom in one of the cavities generates atom-photon entanglement by using the cavity-assisted photon emission, where the internal states of the atom and the polarization states of the emitted photon are entangled or the internal states of atom and the two single-photon pulses at a different time are entangled. Then, the photon propagates to the other cavity in the pair and couple to the atom by time-reversal operation of the atom-photon generation processes, resulting in remote atom-atom entanglement.

In an example, a sequential application of remote atom-atom entanglement generation protocol to N atoms in one of the pair of repeater devices generates N entanglement pair. In an example, the pair of repeater devices can be adjacent to each other, without any intermediary repeater device, although there can be variations.

In an example, among 2N quantum repeaters, a simultaneous application of remote atom-atom entanglement generation protocol to N independent repeater pair and then subsequent application of simultaneous (N−1) remote atom-atom entanglement generation protocol between N repeater pairs generate entanglement generation between all the direct adjacent repeaters, which is the initial condition for entanglement swapping.

In an example, at least one of the plurality of atoms in one of the quantum repeater devices is selected to be resonant to the cavity by shifting a resonance frequency of the atoms with the optical addressing tweezer array to generate atom-photon entanglement using at least cavity-assisted photon generation. One or more internal states of the atom and one or more polarization states of a single photon are entangled or the internal states of atom and at least two pulses of a pair of photons at a different time are entangled. In an example, the cavity-assisted photon generation is characterized by an excited atom causing generation of a photon into the cavity of the nanofiber region.

In an example, once the generating the atom-photon entanglement is provided, and thereafter at least one or more photons propagates to an adjacent repeater device and couples to the one of the atoms selected to be resonant to the cavity by shifting the resonance frequency of the atom with the optical addressing tweezer array. Then, a time-reversal operation of an atom-photon generation process results in a remote atom-atom entanglement. One or more internal states of at least two atoms at one or more remote sites are entangled. In an example, the time reversal operation of the atom-photon generation process causing a photon to be absorbed into the atom.

In an example, the remote atom-atom entanglement is provided sequentially using a generation protocol to M atoms in each repeater device to generate O entanglement pair, where M and O are integers. In an example, the remote atom-atom entanglement is generated between a pair of adjacent repeater devices.

As an example in a configuration where each pair of directly adjacent quantum repeater devices are considered, a specific protocol is employed. This protocol ensures that at least O out of M atoms from one quantum repeater device pair are entangled with at least O out of the M atoms from the other quantum repeater device in the same pair. This entanglement is achieved through a remote atom-atom entanglement protocol. To establish entanglement between the atoms in different entangled pairs within the intermediate quantum repeaters, a controlled-NOT gate is applied. This gate operates on two atoms, each from a different entangled pair, enabling the entanglement between them. Following this step, single qubit control and state readout of two atoms in the intermediate quantum repeaters are performed. As a result of these operations, the remaining two atoms in the directly adjacent quantum repeaters become directly entangled. It is important to note that the values of O and M are integers, and their specific values determine the minimum number of entangled atoms required for the protocol.

In an example where each pair of repeater devices that are directly adjacent with each other, such devices are configured such that at least one of M atoms from one of the pairs of repeater devices are entangled with at least one of the M atoms from the other repeater device in the same pair of repeater devices by a remote atom-atom entanglement protocol. By applying a controlled-NOT gate between the two atoms from the different entangled pair in the same intermediate quantum repeaters and subsequent single qubit control and the state readout of two atoms in the intermediate quantum repeaters, the other two atoms in the adjacent quantum repeaters are directly entangled causing entanglement swapping.

Of course, there can be variations, modifications, and alternatives.

Figure 5:
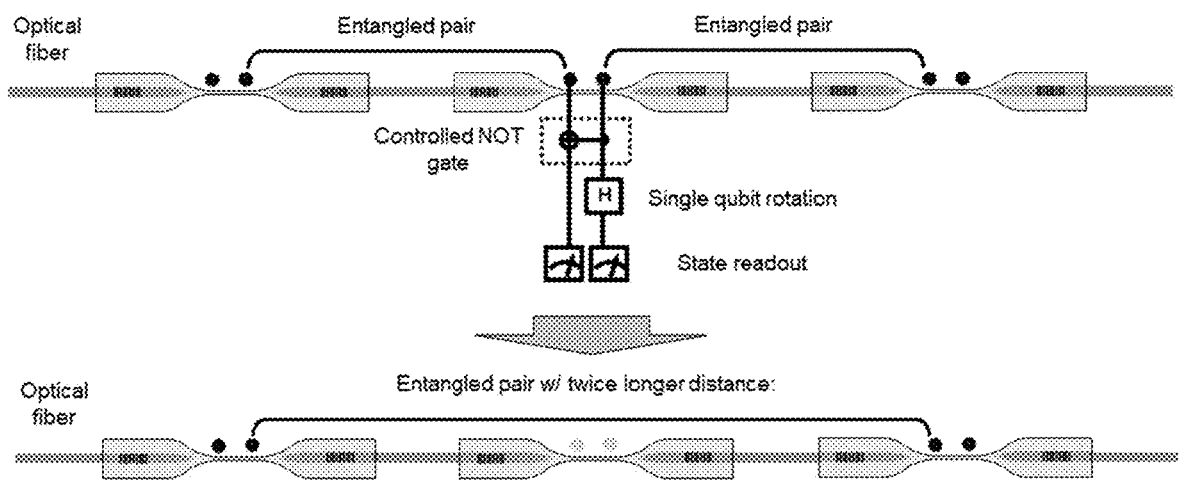
FIG. 5 is a simplified illustration of a method of entanglement swapping in a quantum repeater network according to an example of the present invention.

FIG. 5 is a simplified illustration of a method of entanglement swapping in a quantum repeater network according to an example of the present invention. Each quantum repeater incorporates two atoms and more where one of atoms in adjacent repeaters is entangled. Then, entanglement swapping is implemented by applying controlled-NOT gate, following single-qubit gate and state readout at the intermediate repeater. In an example, the controlled NOT gate has a control bit, and a target bit, which is a "1" or "0".

In an example, a controlled NOT gate, commonly abbreviated as CNOT gate, is a logic gate used in quantum computing and reversible computing. It is a two-qubit gate that operates on two qubits, a control qubit and a target qubit. The CNOT gate flips the state of the target qubit (changes 0 to 1 and 1 to 0) if and only if the control qubit is in the state |1⟩. In an example, the CNOT gate can be represented by a 4×4 matrix.

Figure 6:
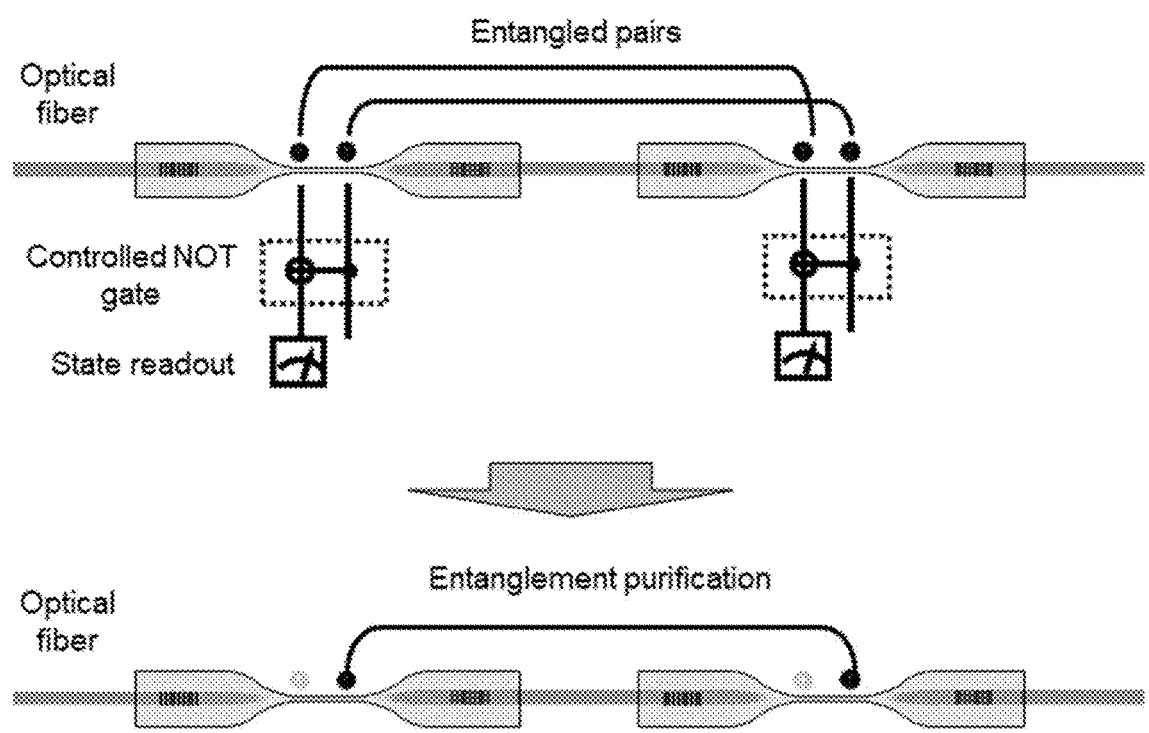
FIG. 6 is a simplified illustration of a method of entanglement purification in a quantum repeater network according to an example of the present invention.

FIG. 6 is a simplified illustration of a method of entanglement purification in a quantum repeater network according to an example of the present invention. N entangled pairs between adjacent repeaters are purified to one or more qubits with higher fidelity than before by sequentially applying the controlled-NOT gate to the two atoms among N atoms in a quantum repeater and subsequent state readout of the target atom.

In an example, the system has variations.

In an example, each pair of quantum repeater devices that are directly adjacent to each other are configured such that at least one of two atoms from one of the pairs of quantum repeater devices are entangled with at least one of the two atoms from the other pair of quantum repeaters. Such devices are configured by applying a controlled-NOT gate between the two atoms in one of the pair of quantum repeaters and single qubit control to connect to the other two atoms in the other pair of quantum repeaters and further applying the state readout of two atoms in the one of the quantum repeaters.

In an example, the entanglement swapping protocol extend the range of entangled pair without direct transmission of photons.

In an example, the optical cable has a length ranging from a meter to tens of kilometers or more. In an example, the optical cable has a predetermined length to facilitate entanglement between the pair of quantum repeater devices. Other variations can exist.

In an example, each pair of quantum repeater devices that are directly adjacent to each other are configured such that at least one of two atoms from one of the pairs of quantum repeater devices are entangled with at least N of the 2N atoms from the other pair of quantum repeaters. Such devices are configured by applying controlled-NOT gate between the N atoms in one of the pair of quantum repeaters to connect to the other N atoms in the other pair of quantum repeaters and apply the state readout of one of the pair of quantum repeaters, whereupon N is an integer of 1 and greater. In an example, N is two or more, and wherein the entanglement among the N atoms is purified to M atoms with improved entanglement fidelity where M ranges from 1 to N−1.

In an example, the two or more atoms is characterized by a quantum memory time of longer than one microsecond to facilitate entanglement generation between at least two atoms to form a connection and allow entanglement swapping and purification with entangled pairs maintained.

In an example, the system has the imaging system comprising a first lens to an nth lens, where n is an integer greater than 1. The imaging system is configured to magnify an image ranging ten to fifty times to capture the magnified image within a predetermined spectral range using array of pixels configured by at least one thousand by one thousand pixels to create a spatial resolution of ranging from 0.5 micron to 2 micron over a spatial region of one by one millimeters, among others.

In an example, the imaging system is coupled to an image processing device. The image processing device is configured to receive a stream of data comprising the captured image and configured to process the captured image into a gray scale image map to threshold the gray scale image map to output a binary representation of the captured image to identify one of more of the plurality of atoms. In an example, the image processing device is configured to receive a stream of data comprising the captured image and is configured to process the captured image into to identify a spatial location of a portion of the nanofiber region and is configured to provide feedback to change the spatial location of the portion of the nanofiber to align the imaging system to the nanofiber region. In an example, the imaging system comprising a laser light source configured a predetermined wavelength range. The laser light source is configured with a dichroic mirror to reflect or transmit a laser beam and traverse through an objective lens to focus onto a selected portion of the nanofiber region such that a portion of the laser beam is reflected back through the dichroic mirror to be imaged on an array of pixels. In an example, the beam is characterized by a single mode having a wavelength ranging from 300 nm to 2.0 microns.

In an example, the imaging system comprising a laser light source configured a predetermined wavelength range. In an example, the laser light source is configured with a spatial light modulator configured with an objective lens to form a plurality of laser beams configured as the optical tweezer array to focus onto a selected portion of the nanofiber region such that a portion of the laser beam is reflected back through the dichroic mirror to be imaged on an array of pixels.

In an example, the system further comprising a vacuum chamber configured to maintain at least the nanofiber region in a predetermined vacuum environment, a predetermined temperature environment ranging from room temperature to 4 Kelvin. The chamber is substantially free from a magnetic field that may interact with one or more of the plurality of atoms. In an example, the magnetic field is blocked from an interior of the vacuum chamber using a magnetic field shield device configured with the vacuum chamber.

In an example, the system has a laser device coupled to the core region of the nanofiber region. In an example, the laser device is configured to control a cavity resonance frequency to a transition frequency of a selected atom by changing a temperature of the nanofiber region.

In an example, the cavity is maintained in a vacuum environment and the plurality of atoms are cool down to a temperature of below 1 milli-Kelvin by a magneto-optical trapping generated from a combination of a magnetic field gradient and a laser irradiation from three orthogonal spatial direction, and subsequent laser cooling with atoms trapped in the tweezer array where the motional degree-of-freedom is cool down to a ground state or within a vicinity of a ground state.

In an example, the optical tweezer array comprises an optical tweezer device configured to generate one or more optical tweezer spots such that the optical tweezer device is in spatial alignment to the nanofiber region and is stabilized with a feedback process by monitoring an optical signal derived from the nanofiber region.

In an example, the one or more of the plurality of atoms are trapped by using an optical tweezer device from the optical tweezer array. In an example, the optical tweezer device is configured with a feedback process to receive an optical signal coupled from the nanofiber region to align the one or more atoms at the distance of 100 nanometer to 1 micrometer from the nanofiber region.

In an example, the optical addressing arrays comprise optical addressing devices configured to generate one or more optical beam spots such that the optical addressing devices are in spatial alignment to the nanofiber region and is stabilized with a feedback process by monitoring an optical signal derived from the nanofiber region.

In an example, the system has a laser device illuminating one or more the plurality of atoms from three orthogonal spatial directions to reduce a temperature of and image one or more of the atoms independent of an atom-cavity coupling. The laser device is characterized by an operating wavelength with >1 Terahertz difference from an atom-cavity resonance.

In an example, the one or more of the plurality of atoms emit a plurality of photons configured to be collected at the nanofiber region and be transmitted to the optical fiber cable coupled to the nanofiber region.

In an example, at least one of the plurality of atoms and a reflected photon from the cavity are configured to operate a controlled phase-flip gate.

In an example, at least two of the plurality of atoms are configured to operate a controlled phase-flip gate by reflecting a single photon, and N atoms being configured to operate N-qubit Toffoli gate by reflecting a single photon where N is integer and larger than 3.

In an example, at least two of the plurality of atoms are configured to operate spin-spin interactions including the controlled phase-flip gate by exchanging the virtual photons through the cavity.

In an example, the system has an optical filtering device coupled to the optical fiber cable. In an example, the optical filtering device is configured to couple photons from the atoms and remove additional photons not emitted from the atoms and derived from other laser devices and emission from the material into the optical fiber cable.

In an example, the present invention includes various methods of using any of the techniques described herein, which can include others. The methods include use of a quantum repeater device configured in a network to perform any of the aforementioned techniques. Of course, there can be variations, modifications, and alternatives.

REFERENCES

[1] H. J. Briegel, W. Dur, J. I. Cirac, and P. Zoller, Phys. Rev. Lett. 81, 5932 (1998).
[2] L.-M. Duan and H. J. Kimble Phys. Rev. Lett. 92, 127902 (2004).
[3] L.-M. Duan, B. Wang, and H. J. Kimble Phys. Rev. A 72, 032333 (2005)
[4] C—. L. Hung, A. Gonzalez-Tudela, J. I. Cirac and H. J. Kimble, Proceeding of National Academy of Science, 113, E4946 (2016).

While the above is a full description of the specific examples, various modifications, alternative constructions, and equivalents may be used. As an example, the device can include any combination of elements described above, as well as outside of the present specification. Additionally, the terms first, second, third. and final do not imply order in one or more of the present examples. In an example, the descriptions use terms such as "N" "O" "M" and others, as representing an integer but can also include variations, including partial entities. Therefore, the above description and illustrations should not be taken as limiting the scope of the present invention which is defined by the appended claims.

The invention claimed is:

1. A quantum repeater system including a plurality of repeater devices, including an initial repeater device and a final repeater device, the system comprising:
one or more intermediary repeater devices numbered from 1 to N, where N is an integer greater than or equal to 1 coupled between the initial repeater device and the final repeater device,
each of the intermediary repeater devices comprising:
a first fiber optical cable having a first end region and a second end region, the first end region having a first end, and the second end region having a second end;
a first fiber Bragg Grating configured on the first end region;
a second fiber Bragg Grating configured on the second end region;
a nanofiber region configured from a center portion of the fiber optic cable and coupled between the first end region and the second end region;
a first taper region configured from a first portion of the nanofiber region of the first fiber Bragg Grating and a second taper region configured from a second portion of the nanofiber region of the second fiber Bragg Grating;

a cavity formed from the nanofiber and tapered regions between the first fiber Bragg Grating and the second fiber Bragg Gratings;

a plurality of atoms selected from at least one of a cesium, a rubidium, an ytterbium, a strontium or other laser coolable atoms such that a number of the atoms range from one to 100,000 and are evanescently coupled to at least the nanofiber region between the first fiber Bragg grating and the second fiber Bragg grating;

an optical system comprising an imaging system, coupled to an trapping tweezer array and an controlling tweezer array to trap and manipulate two or more of the plurality of atoms; and a plurality of optical cable, where one of the plurality of optical cables is coupled to at least one of the intermediary repeater devices, the initial repeater device, and the final repeater device in a serial connection to transmit one or more photons from the initial repeater device to one of the intermediary repeater device and then to the final repeater device to distribute a quantum entanglement that has been generated between at least a pair of adjacent repeaters that connected in a direct communication.

2. The system of claim 1 wherein at least one of the plurality of atoms in one of the repeater devices is selected to be resonant to the cavity by shifting a resonance frequency of the atoms with the controlling tweezer array to generate atom-photon entanglement using at least cavity-assisted photon generation whereupon one or more internal states of the atom and one or more polarization states of a single photon are entangled or the internal states of atom and at least two pulses of a pair of photons at a different time are entangled; whereupon the cavity-assisted photon generation is characterized by an excited atom causing generation of a photon into the cavity of the nanofiber region.

3. The system of claim 2 wherein generating the atom-photon entanglement is provided, and thereafter at least one or more photons propagates to an adjacent repeater device and couples to the one of the atoms selected to be resonant to the cavity by shifting the resonance frequency of the atom with the controlling tweezer array, and then, a time-reversal operation of an atom-photon generation process results in a remote atom-atom entanglement whereupon one or more internal states of at least two atoms at one or more remote sites are entangled, the time reversal operation of the atom-photon generation process causing a photon to be absorbed into the atom.

4. The system of claim 3 wherein the remote atom-atom entanglement is provided sequentially using a generation protocol to M atoms in each repeater device to generate O entanglement pair; whereupon the remote atom-atom entanglement is generated between a pair of adjacent repeater devices, M ranges from 1 and greater.

5. The system of claim 3 wherein between 2N repeater devices are characterized by a simultaneous or a sequential application of a remote atom-atom entanglement generation protocol to N repeater device pairs and then a subsequent application of simultaneous or a sequential (N−1) remote atom-atom entanglement generation protocol between the N repeater device pairs to generate entanglement between each adjacent repeater devices such that the entanglement generation protocol for all the adjacent repeaters provides an initial condition for entanglement swapping.

6. The system of claim 1 wherein each pair of repeater devices that are directly adjacent and are configured such that at least one of M atoms from one of the pairs of repeater devices are entangled with at least one of the M atoms from the other repeater device in the same pair of repeater devices by a remote atom-atom entanglement protocol; and by applying a controlled-NOT gate between the two atoms from the different entangled pair in the same intermediate repeater devices and subsequent single qubit control and the state readout of two atoms in the intermediate repeater devices, the other two atoms in the adjacent repeaters are directly entangled causing entanglement swapping.

7. The system of claim 6 wherein the atom-atom entanglement swapping protocol extend a range of the entangled pair without direct transmission of photons; whereupon for M−1 entangled pair among the N repeater devices, the entanglement swapping can be applied to the N−1 repeater devices simultaneously.

8. The system of claim 1 wherein the optical cable has a length ranging from a meter to a plurality of kilometers.

9. The system of claim 1 wherein the optical cable has a predetermined length to facilitate entanglement between the pair of repeater devices.

10. The system of claim 1 wherein each pair of repeater devices that are directly adjacent are configured such that at least O of M atoms from one of the pairs of repeater devices are entangled with at least O of the M atoms from the other repeater device in the pair of repeater devices by remote a atom-atom entanglement protocol, and by applying a controlled-NOT gate between the two atoms from the different entangled pair in the same intermediate repeater devices and subsequent single qubit control and the state readout of two atoms in the intermediate repeater devices, the other two atoms in the adjacent repeater devices are directly entangled, where each of O and M is an integer.

11. The system of claim 9 wherein O is two or more and M is larger than O, and wherein the entanglement among the N atoms is purified to L atoms with an improved entanglement fidelity where L ranges from 1 to O−1 by sequentially applying the controlled-NOT gates to the two atoms among N atoms in a repeater device by selectively coupling to the cavity by the frequency shift from a locally controlling tweezer array and subsequent state readout of the target atom.

12. The system of claim 1 wherein the two or more atoms is characterized by a quantum memory time of longer than one microsecond to facilitate entanglement generation between at least two atoms to form a connection and allow entanglement swapping and purification with entangled pairs maintained.

13. The system of claim 1 wherein the imaging system comprising a first lens to an Nth lens, where N is an integer greater than 1, configured to magnify an image ranging ten to fifty times to capture the magnified image within a predetermined spectral range using array of pixels configured by at least one thousand by one thousand pixels to create a spatial resolution of ranging from 0.5 micron to 2 micron over a spatial region of one by one millimeters;

wherein the imaging system is coupled to an image processing device, the image processing device being configured to receive a stream of data comprising the captured image and configured to process the captured image into a gray scale image map to threshold the gray scale image map to output a binary representation of the captured image to identify one or more of the plurality of atoms; wherein the image processing device being configured to receive a stream of data comprising the captured image and configured to process the captured image into to identify a spatial location of a portion of the nanofiber region; and configured to provide feedback to change the spatial location of the portion of the nanofiber to align the imaging system to the nanofiber region; and wherein the imaging system comprising a laser light source configured a predetermined wavelength range, the laser light source is configured with a dichroic mirror to reflect or transmit a laser beam and traverse through an objective lens to focus onto a selected portion of the nanofiber region such that a portion of the laser beam is reflected back through the dichroic mirror to be imaged on an array of pixels, the beam is characterized by a single mode having a wavelength ranging from 300 nm to 2.0 microns.

14. The system of claim 1 wherein the imaging system comprising a laser light source configured a predetermined wavelength range, the laser light source is configured with a spatial light modulator configured with an objective lens to form a plurality of laser beams configured as the trapping tweezer array and controlling tweezer array to focus onto a selected portion of the nanofiber region such that a portion of the laser beam is reflected back through the dichroic mirror to be imaged on an array of pixels.

15. The system of claim 1 further comprising a vacuum chamber configured to maintain at least the nanofiber region in a predetermined vacuum environment, a predetermined temperature environment ranging from room temperature to 4 Kelvin, and a magnetic field shield device configured with the vacuum chamber to block a magnetic field from an interior region of the vacuum chamber.

16. The system of claim 1 further comprising a laser device coupled to the core region of the nanofiber region, the laser device being configured to control a cavity resonance frequency to a transition frequency of a selected atom by changing a temperature of the nanofiber region.

17. The system of claim 1 wherein the cavity is maintained in a vacuum environment and the plurality of atoms are cool down to a temperature of below 1 milli-Kelvin by a magneto-optical trapping generated from a combination of a magnetic field gradient and a laser irradiation from three orthogonal spatial direction, and subsequent laser cooling with a plurality of atoms trapped in the tweezer array where a motional degree-of-freedom of the atoms is cool down to a ground state or within a vicinity of the ground state.

18. The system of claim 1 wherein the optical trapping tweezer array and the controlling tweezer array comprises optical tweezer devices configured to generate one or more optical tweezer spots such that the optical tweezer devices are in spatial alignment to the nanofiber region and are stabilized with a feedback process by monitoring an optical signal derived from the nanofiber region.

19. The system of claim 1 wherein one or more of the plurality of atoms are trapped by using an optical tweezer device from the trapping tweezer array, the optical tweezer device configured with a feedback process to receive an optical signal coupled from the nanofiber region to align the one or more atoms at the distance of 100 nanometer to 1 micrometer from the nanofiber region.

20. The system of claim 1 wherein the controlling arrays comprise controlling tweezer devices configured to generate one or more optical beam spots such that the optical controlling devices are in spatial alignment to the nanofiber region and is stabilized with a feedback process by monitoring an optical signal derived from the nanofiber region.

21. The system of claim 1 further comprising a laser device illuminating one or more the plurality of atoms from three orthogonal spatial directions to reduce a temperature of and image one or more of the atoms independent of an atom-cavity coupling, the laser device being characterized by an operating wavelength with >1 Terahertz difference from an atom-cavity resonance.

22. The system of claim 1 wherein the one or more of the plurality of atoms emit a plurality of photons configured to be collected at the nanofiber region and be transmitted to the optical fiber cable coupled to the nanofiber region.

23. The system of claim 1 wherein at least one of the plurality of atoms and a reflected photon from the cavity are configured to operate a controlled phase-flip gate.

24. The system of claim 1 wherein at least two of the plurality of atoms are configured to operate a controlled phase-flip gate by reflecting a single photon, and N atoms being configured to operate N-qubit Toffoli gate by reflecting a single photon where N is integer and larger than 3.

25. The system of claim 1 wherein at least two of the plurality of atoms are configured to operate spin-spin interactions including the controlled phase-flip gate by exchanging the virtual photons through the cavity.

26. The system of claim 1 further comprising an optical filtering device coupled to the optical fiber cable, the optical filtering device being configured to couple photons from the atoms and remove additional photons not emitted from the atoms and derived from other laser devices and emission from the material into the optical fiber cable.

* * * * *